Sept. 5, 1967    R. E. CRANDALL    3,339,672

TRANSMISSION CONTROL SYSTEM

Filed Nov. 29, 1965    3 Sheets-Sheet 1

RICHARD E. CRANDALL
INVENTOR

BY
BUCKHORN, BLORE, KLARQUIST & SPARKMAN
ATTORNEYS

16
United States Patent Office 3,339,672
Patented Sept. 5, 1967

3,339,672
TRANSMISSION CONTROL SYSTEM
Richard E. Crandall, Portland, Oreg., assignor to Hyster Company, Portland, Oreg., a corporation of Nevada
Filed Nov. 29, 1965, Ser. No. 510,328
19 Claims. (Cl. 187—9)

The present invention relates to transmissions for industrial lift trucks and other vehicles in which the engine is used to power both the driving wheels and a load-lifting mechanism and in which the transmission is subject to frequent reversal. More particularly, the invention relates to an improved transmission control system for such vehicles.

Lift trucks are usually provided with an inching control which enables slow speed movement of the truck while the engine is operated at moderate or high speed to lift a load. However, many prior inching controls have been highly sensitive to engine speed so as to be inconsistent in performance, making inching control difficult.

Accordingly, a primary object of the present invention is to provide a new and improved transmission control system incorporating an improved inching control, the operation of which is unaffected by varying engine speeds.

Another object is to provide a transmission control system in which the inching control is operable through the application of brake fluid pressure so that inching control is unaffected by the wear condition of the brakes.

A further object is to provide an inching valve which is balanced between brake fluid pressure and clutch fluid pressure so that the transmission can be placed in neutral by either increasing brake fluid pressure to a predetermined extent, or by relieving clutch fluid pressure.

A specific feature of the inching control is an inching spool which regulates clutch pressure downstream therefrom by balancing itself between downstream clutch pressure and a variable force spring, with the variation of the force in such spring being achieved hydraulically by brake line pressure.

Lift trucks and other vehicles subject to frequent reversal in operation are often provided with transmission controls by which shifting into forward and reverse is accomplished hydraulically. Nevertheless, the frequent reversal of direction during operation, often at high engine speeds, results in harsh clutch lock-up which is hard on the operator, drive train components, engine and tires. With many prior transmissions, smooth clutch lock-up at high engine speeds could only be accomplished through use of the inching pedal to provide clutch slippage, in addition to the directional control pedal.

Accordingly, another primary object is to provide in a transmission control system means for automatically providing a smooth but fast clutch engagement regardless of engine speed and without the use of the inching control.

A feature of this means is a clutch pressure modulator valve which, upon reversal of direction, permits a fast build-up of clutch pressure to the point of close-up of the clutch pack but which thereafter becomes operative to slow down the pressure build-up to the point of clutch lock-up.

Ideally a lift truck operator should be able to perform numerous operations either simultaneously or in close sequence for maximum efficiency, including hoisting the load, tilting the mast, steering, reversing directon, inching, braking, accelerating and decelerating the engine, and restarting the engine, to name the most frequent operations. Because of this, continual efforts have ben made to simplify the controls of lift trucks so that the foregoing operations could be performed with a minimum number of controls. For example, controls have been simplified to such an extent that both inching and braking can be controlled by one foot pedal and both direction and engine speed controlled with another foot pedal, as shown in U.S. Patent 2,968,967. The present transmission control system is an improvement over the control system shown in such patent in that the present system further simplifies lift truck operation while at the same time providing certain additional safety features.

Accordingly, another primary object is to provide a new and improved transmission control system for a lift truck which simplifies, and therefore increases the efficiency of, lift truck operation by intertying the truck's clutch, brake and starter circuits.

An important object made possible by the foregoing intertie is simplified engine starting, especially after a stall or on hills by permitting starting when either (1) the vehicle's service brakes are applied to the full extent or (2) the parking brake is set.

Another important object achieved by the foregoing intertie is safe engine starting by preventing engine starting without both (1) the wheel brakes being applied and (2) the transmission being in neutral.

A further object is to provide simplified engine starting despite the foregoing dual safety features by providing an inching control which automatically acts to disengage the clutch upon (1) application of the service brakes to a predetermined extent or (2) application of the parking brake.

Another object is to provide an integrated transmission control system embodied in nearly its entirety in a single valve block, with fluid flow being confined largely within either machined cavities or cast passages within such block so as to minimize leakage, simplify manufacture and maintenance and reduce cost.

The above and other objects and advantages will become more apparent from the following detailed description which proceeds with reference to the accompanying drawings wherein.

GENERAL DESCRIPTION

Figure 1:
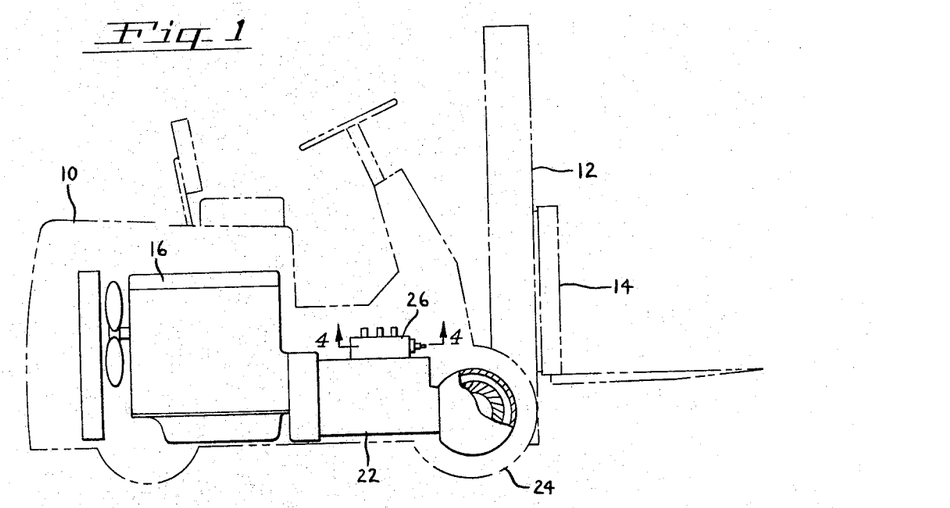
FIG. 1 is a schematic side elevational view of a drive system for lift truck with the lift truck outline being indicated in phantom lines.

With reference to the drawings, FIG. 1 discloses in phantom outline a lift truck 10 having an upright and forwardly and rearwardly tiltable mast 12 with a load-lifting carriage 14 mounted for vertical movement thereon. Mounted within the body of the lift truck is an engine 16 and a drive train including a drive shaft 18, torque converter 20 and transmission 22 for delivering power from the engine to drive wheels 24.

Figure 4:
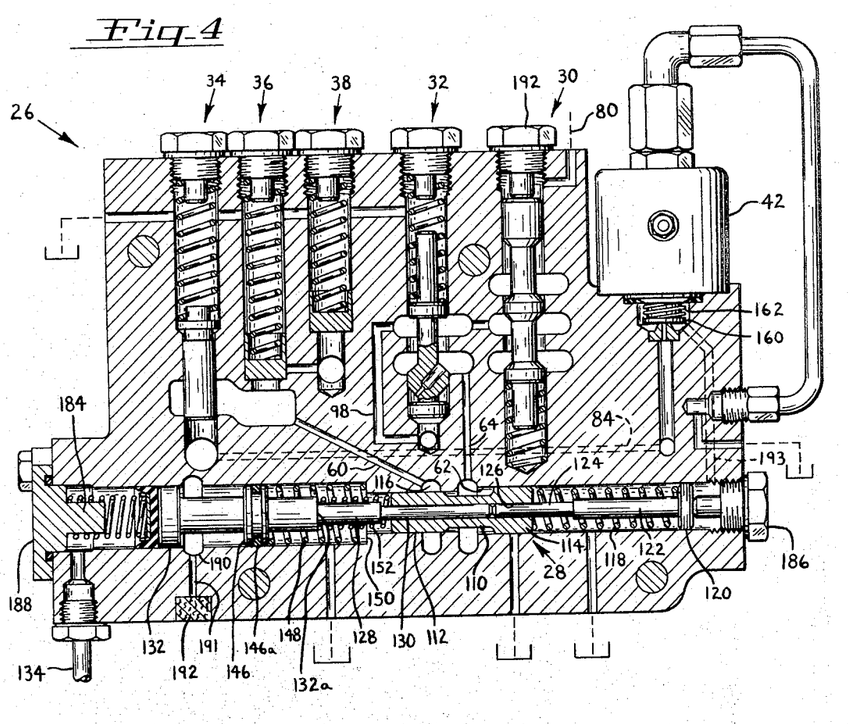
FIG. 4 is a horizontal sectional view taken approximately along the line 4—4 of FIG. 1 showing, on a scale greatly enlarged from that of FIG. 1, the valve block incorporating the transmission control system.

The primary elements of the transmission control system are embodied in a single valve block 26 mounted on the transmission housing. The interior of this block is revealed in FIG. 4 and includes an inching valve assembly 28, a forward-reverse clutch selector valve 30, and a clutch pressure modulating valve 32 to prevent harsh clutch lock-up when engaging the clutch at all engine speeds. The block also includes a series of three pressure-regulating valves 34, 36 and 38 for regulating the pressure of fluid delivered from an engine-driven pump 40

(see FIG. 2) to the selector valve, the inching valve, clutch and torque converter through the various oil passages in the block.

The block also includes a solenoid valve 42 which controls the flow of pressure fluid to one end of the inching valve cavity in a manner and for a reason to be explained hereinafter in connection with operation of the inching valve.

Figure 2:
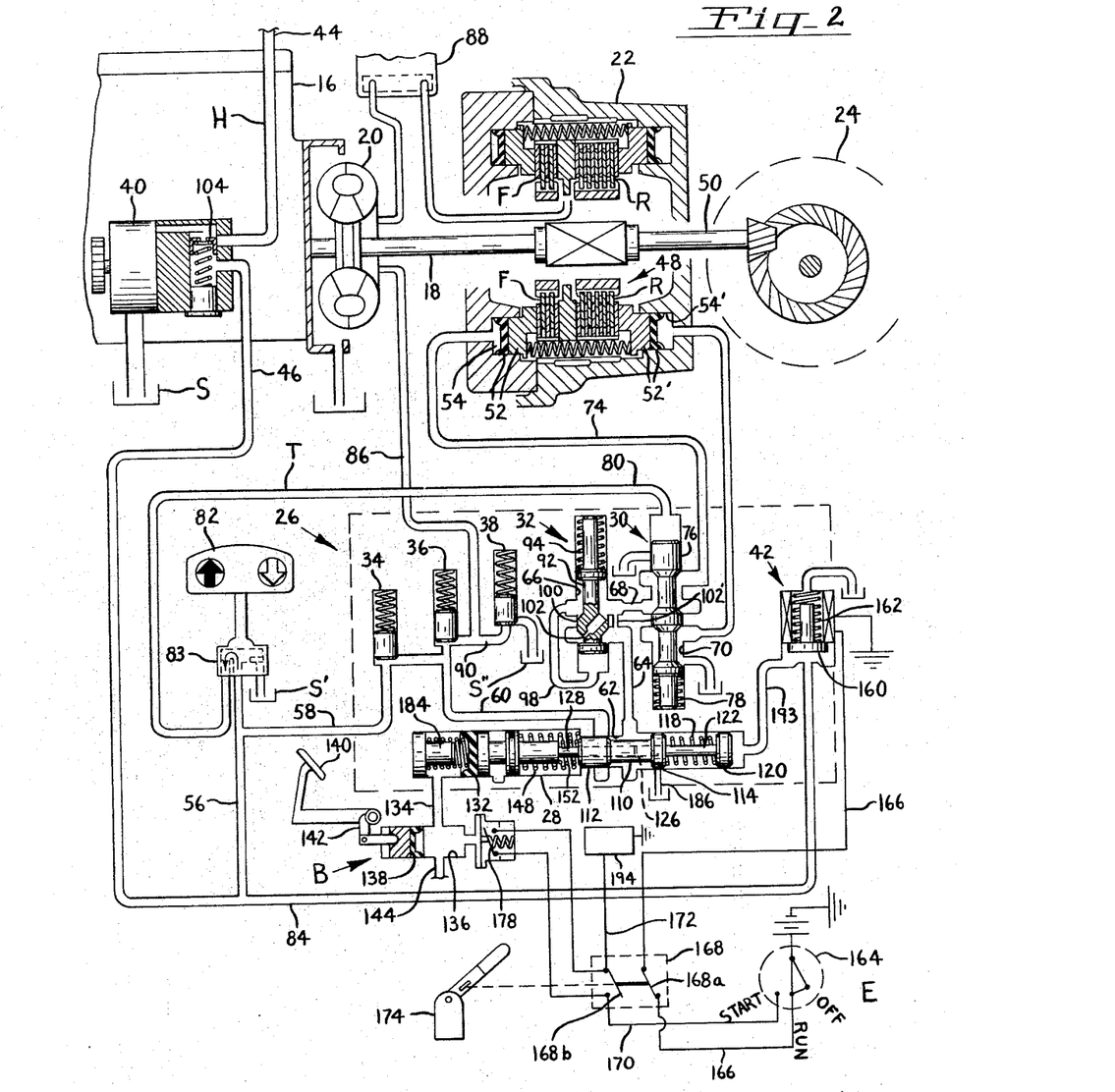
FIG. 2 is a schematic view of a transmission control system in accordance with the present invention and related elements operated in conjunction therewith with the system being shown in its inching forward condition.

Referring to the circuit diagram of FIG. 2, engine 16 drives a fixed displacement pump 40 at variable speed. Pump 40 delivers fluid under pressure from a sump S through an integral flow divider to both an entrance passage 44 forming part of the hoist circuit H leading to a hoist cylinder (not shown) for raising carriage 14 and a pair of tilt cylinders for tilting mast 12, and to an entrance passage 46 forming part of the transmission pressure fluid circuit, this flow being held contant by the flow divider.

Transmission 22 is equipped with a fluid-actuated clutch 48 including a forward clutch pack F and a reverse clutch pack R. One or the other of the clutch packs is locked up to transmit power from drive shaft 18 to a driven shaft 50 in the desired direction by the force of clutch pressure fluid acting against a clutch piston 52 within a clutch cylinder 54. The clutch pistons and cylinders are grounded, that is, they are stationary relative to the drive shaft so that centrifugal force has no effect on the clutch fluid and therefore on the clutch piston. Thus clutch lock-up occurs at the same clutch line pressure regardless of the speed of rotation of drive shaft 18, the importance of which will become apparent in the discussion, supra, of the clutch pressure modulator means. Grounded clutches of the foregoing-described type are well known in the automotive field and therefore need not be described in detail herein.

Fluid under pressure flows to either forward clutch piston 52 or reverse clutch piston 52' through the clutch fluid circuit including passage 46 and passages 56, 58 and 60 leading into inching valve cavity 62. From such cavity the clutch fluid flows through passage 64 to bore 66 of clutch pressure modulating valve 32, and from such bore through passage 68 to bore 70 of selector valve 30. From the latter bore, clutch fluid passes through either reverse clutch passage 72 into reverse clutch cylinder 54' or through forward clutch passage 74 to the forward clutch cylinder 54, depending on the position of selector valve 30. In FIG. 2 valve 30 is shown in its lower, forward drive position.

Figure 3:
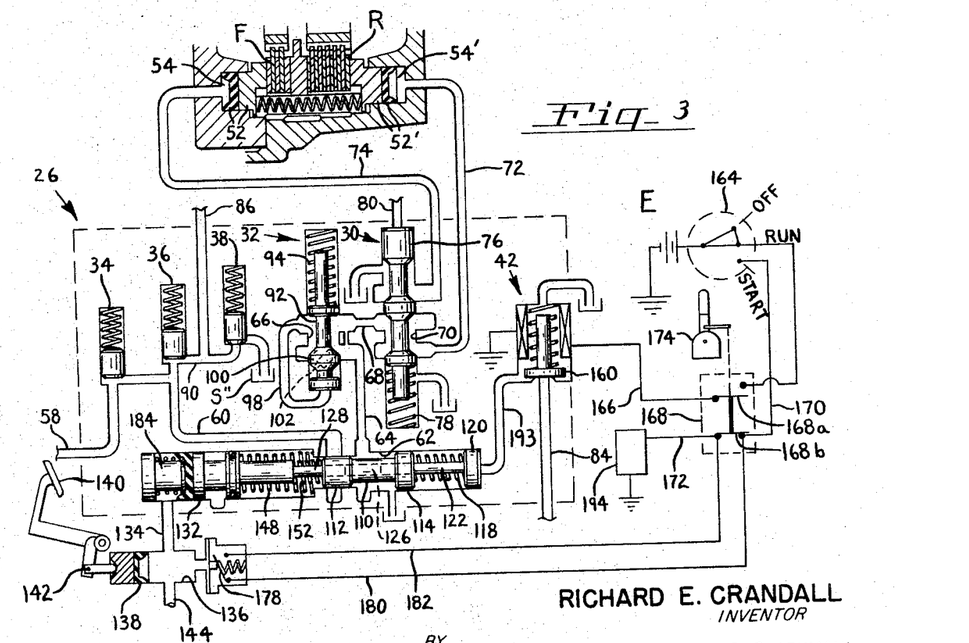
FIG. 3 is a schematic view of key portions of the transmission control system of FIG. 2 on approximately the same scale as FIG. 2, but with the system being shown in its "park" condition.

Directional control valve 30 includes a valve spool 76 which is normally biased by a spring 78 to an upward position as shown in FIG. 3 to permit fluid to flow from passage 68 and into passage 72 leading to the reverse clutch cylinder. However, when fluid under pressure is admitted into the upper end of bore 70 through passage 80, spool 76 is forced downward against the pressure of spring 78 to block flow to reverse clutch passage 72 and thereby disengage the reverse clutch pack and open flow into forward clutch passage 74 to engage the forward clutch pack. A combination accelerator and directional control pedal 82 when depressed on its left side, as viewed in FIG. 2, opens a valve 83 to flow of pressure fluid from line 56 to line 80 to drive the truck in a forward direction. Depressing the right side of foot pedal 82 blocks flow from passage 56 and opens passage 80 to sump S' whereby directional control spool 76 is positioned to direct clutch pressure to the reverse clutch. The construction and operation of pedal 82 and its associated elements, including the directional control valve, is disclosed in detail in United States Patent 2,968,967, issued Jan. 24, 1961, to C. J. Ross, Jr., and so is not described in further detail herein.

Pressure-regulating valve 34 in passage 58 controls the pressure at which fluid on its upstream side flows through passage 56 to pedal 82 and through auxiliary clutch passage 84 to the right-hand end of inching cavity 62. Pressure-regulating valve 36 downstream from valve 34 is set at a value to provide flow through line 60 to the clutch at a pressure slightly below that in lines 56 and 84. The third pressure regulator 38 is provided in a passage 90 leading to sump S" and is set at a value such that fluid flows to the torque converter through a passage 86 at a pressure below that in the clutch circuit.

CLUTCH PRESSURE MODULATOR

Clutch pressure modulating valve 32 provides a smooth lock-up of the selected clutch pack when reversing direction without the necessity of using the inching control, described hereinafter, to slip the clutch. The modulator valve includes a valve spool 92 in valve cavity 66. The spool is biased by a spring 94 to its downward position as shown in FIG. 3 during the initial low pressure stage of clutch fluid pressure build-up to a value sufficient to close the selected clutch pack immediately after shifting the selector valve 30. This permits clutch fluid to flow unrestricted through modulator valve cavity 66 to the selected clutch, resulting in an initial fast fill-up of the clutch cylinder. This fast filling up and thus rapid build-up of clutch pressure continues until the clutch piston closes up the selected clutch pack. At this point, and at a clutch pressure below that required for lock-up of the clutch pack, a bypass passage 98 to the bottom of the spool cavity permits clutch pressure to shift modulator spool 92 to its upper position wherein land 100 restricts flow to the selected clutch. Thereafter, any flow is through an orifice 102 in land 100, and this restriction causes a gradual increase in clutch pressures to the point of clutch lock-up, resulting in a smooth clutch lock-up even though the engine might be operating at high speed.

It is, of course, important that the pressure of spring 94 be carefully selected so that intrusion of orifice 102 into the clutch fluid passage occurs precisely at a pressure just above that sufficient to close the selected clutch pack but at a pressure below that required to lock up such clutch pack so that lock-up is gradual but clutch engagement is still relatively fast.

For valve spool 92 to shuttle at just the right moment at all engine speeds, it is necessary that the valve be supplied with fluid at a relatively constant rate of flow regardless of engine speed. Otherwise, if flow increased with engine speed, the resultant pressure drop in the clutch circuit could cause the modulator valve 92 to shuttle at the wrong time relative to clutch lock-up. To prevent this, a flow divider 104 on the output side of pump 40 supplies main passage 46 of the transmission circuit with fluid at a substantially constant flow rate at all engine speeds.

The flow divider also improves the action of inching valve 28 by removing engine speed as a variable factor influencing operation of the inching valve. Thus manipulation of the inching pedal to a given extent effects the same amount of inching regardless of engine speed.

Instead of orifice 102 being provided in the modulator spool, such orifice could be provided in the valve block 26 itself as, for example, in the location identified by the dashed line 102' of FIG. 2. However, in the block construction of the illustrated transmission control, providing an orifice in the block itself would present certain practical difficulties in manufacture.

In the use of a modulator spool as described it is important that the clutch be grounded as previously mentioned. Otherwise, centrifugal force would enter in to cause a clutch lock-up at varying line pressures depending on the speed of rotation of drive shaft 18. Thus under conditions of high centrifugal force, clutch lock-up might occur before the modulator spool shifted to its pressure restricting position.

INCHING CONTROL

The inching valve assembly 28 includes an inching valve spool 110 having a land 112 at one end which is of slightly smaller diameter than another land 114 at the opposite end thereof. The spool is positioned within cavity 62 straddling inlet clutch passage 60 and outlet passage 64. Because of the difference in diameters of the lands, fluid entering cavity 62 from passage 60 tends to move the valve spool toward the left-hand end of the cavity, as viewed in FIG. 4, to restrict flow to passage 64. However, movement of spool 110 to its closed position is resisted by a clutch pressure regulating spring 118 which extends between land 114 and the enlarged head 120 of a plunger 122 having a stem portion 124 extending into a central opening 126 through the valve spool. The effective pressure of spring 118 resisting movement of spool 110 to its closed position is determined by the position of plunger 122, and the position of such plunger is determined, in part, by the pressure, if any, of clutch fluid in the left end (FIG. 4) of the inching cavity. Clutch fluid enters this end through auxiliary passage 84 of the clutch circuit.

The effective pressure of spool-positioning spring 118 is also determined by a second plunger 128 having a stem portion 130 which extends into opening 126 of the inching spool and into abutment with the stem end of plunger 122. Plunger 128 includes an enlarged head, or piston, 132 at its opposite end adjacent the right-hand end of the inching cavity. This end of the cavity communicates with the vehicle's brake fluid circuit B through a passage 134 leading to the master cylinder 136 of the service brakes. A piston 138 within the master cylinder is actuated by a combination brake and inching pedal 140 through a linkage 142 to vary brake line pressure and thus actuate piston 132 in the inching cavity and the wheel brakes. A passage 144 of the brake circuit leads from the master cylinder to the wheel brake cylinders (not shown).

Returning to the inching valve assembly, a brake pressure spring 148 (FIG. 4) is interposed between a piston 146 and a spring seat 150 to reduce the effective brake pressure to the desired extent for operating the inching valve. A neutral positioning spring 152 of relatively low K value compared to spring 118 extends between a shoulder 132a and the end 112 of the inching spool.

To prevent cross-flow of leakage between the brake fluid cavity and the clutch fluid cavity, I provide a reduced diameter on the piston member and an annular groove 190 in the cavity. Brake fluid from the left side (FIG. 4) and clutch fluid from the right side which leak past their respective packings cannot cross the groove by capillary action, but instead escape to atmosphere through port 191. At the end of port 191 there is a porous metal plug 192 which allows fluid seepage but will not allow the entrance of dirt.

Solenoid valve 42 has a valve member 160 which is biased to a normally closed position by a spring 162 to block auxiliary clutch passage 84 to fluid flow and open the clutch end of the inching spool to sump, as shown in FIG. 2. When energized, the solenoid valve opens to permit a fluid flow to and thus a pressure build-up at the clutch pressure end of the inching cavity.

ENGINE STARTER CIRCUIT

Solenoid valve 42 is wired in the engine's electrical starter circuit E and specifically to the "run" terminal of an ignition switch 164 by a line 166. The line 166 is connected across one pair of terminals of a double-pole microswitch 168. The other pair of terminals of the microswitch are connected in the starter circuit by a line 170 from the "start" terminal of the ignition switch and line 172 leading to the starter solenoid (not shown). The two contacts 168a and 168b of the microswitch are operated by setting and releasing a manual parking brake lever 174. With the parking brake in its "off" or released position as shown in FIG. 2, contact 168a is closed to complete a circuit through the ignition switch to open solenoid valve 42 and permit clutch fluid to flow to the clutch end of the inching valve. At the same time contact 168b is opened to break the circuit from the ignition switch to the starter solenoid and thereby prevent starting the engine. However, with the parking brake set as shown in FIG. 3, contact 168a opens to de-energize solenoid valve 42 and thereby block passage 84 and open passage 193 to sump. The effect of this is to disengage the clutch as explained in greater detail shortly. At the same time, contact 168b closes so that the engine can be started by turning ignition switch 164 to its "start" position.

The service brake B is also tied in to the starter circuit by a pressure-sensitive switch 178. This switch is normally open as shown in FIG. 3 when brake pedal 140 is released to prevent completion of a circuit across such switch to the starter solenoid and thereby prevent engine starting. However, when brake pedal 140 is depressed to a degree sufficient (1) to apply the service brakes to an extent sufficient to prevent truck movement and (2) to place the transmission in neutral through the inching spool circuit, switch 178 closes to complete a circuit through lines 180 and 182 from the ignition switch to the starter solenoid as shown in FIG. 2 to permit starting the engine even though the parking brake is released.

The effect of the foregoing service brake and parking brake tie-in with the starting circuit is to permit engine starting either when the parking brake is set, or alternatively, when the service brakes are applied, but not when both are released. In most instances, restarting the engine after a stall will be most conveniently achieved simply by depressing the service brake pedal. The foregoing intertie not only provides a simplified starting procedure, but also provides an important safety feature.

OPERATION OF INCHING VALVE

*a. Engine running, parking brake set*

The operation of the transmission control as described above is as follows with reference to FIGS. 2 and 3. First, assuming that the engine is running but the parking brake is set, the various elements of the transmission control would be in the positions shown in FIG. 3. In this condition, contact 168a of the microswitch is open so that solenoid valve 42 is closed to block oil flow to the clutch pressure end of the inching cavity. Consequently, pressure at this end of the inching cavity is zero, permitting spring 118 to extend to its full length so that it exerts little, if any, pressure against the inching spool. The centering force of spring 152 maintains the inching spool in its extreme right-hand position wherein land 112 blocks inlet clutch passage 60, resulting in there being zero clutch pressure in passage 64 to the clutch, whereby the clutch packs are disengaged.

With the engine running, however, pump 40 supplies a constant and controlled flow of cooling oil to the transmission thruogh passages 46, 56 and 58, and across the pressure-regulating valves 34 and 36, through the torque converter 20 and oil cooler 88. From the transmission the oil is returned to sump through a passage (not shown) for recirculation.

It will also be noted from FIG. 2 that with the engine running and the transmission in neutral there is fluid flow through line 56 to the directional and speed control pedal 82. Although shifting of the pedal under these conditions will shift selector valve 76, this will, nevertheless, have no effect on the clutch circuit since such circuit remains blocked by the inching spool and solenoid valve 42.

With the parking brake set it is also assumed that the service brake pedal is released so that there is no pressure in the service brake circuit. Thus brake pressure regulating spring 148 is in its fully extended position, forcing plunger 128 and piston 132 to their extreme left-hand positions as viewed in FIGS. 2 and 3 wherein the cup portion of the piston abuts against a stop 184.

b. Forward drive

When the left side of directional control pedal 82 is depressed to shift selector spool 76 to its drive forward position as shown in FIG. 2, the vehicle can be moved forward merely by releasing parking brake 174. This energizes solenoid valve 42 to open it and permit clutch fluid to flow under pressure into the clutch fluid end of inching cavity 62. Clutch fluid pressure at this end of the cavity moves plunger 122 to the left in FIG. 2, compressing spring 118, which in turn shifts inching spool 110 to the left so that land 112 clears clutch passage 60 to permit clutch fluid to flow under full pressure into passage 64 and thence through the modulator spool cavity and selector valve cavity into passage 74 to the forward clutch piston. Spring 118 exerts a sufficiently greater force than spring 152 so that when spring 118 is compressed by plunger 122, land 112 is moved to a proper position to open passage 60. A smooth lock-up of the forward clutch pack results due to the action of modulator spool 92 as previously described.

c. Inching forward or reverse

To inch the vehicle in either a forward or a reverse direction, brake-inching pedal 140 is applied to cause brake line pressure to increase and act against piston 132 at the left-hand end of the inching cavity. At a predetermined brake fluid pressure, plunger 128 begins to move to the right against the force of brake pressure regulating spring 148 and against the force of clutch fluid acting on plunger 122. Since plungers 128 and 122 abut each other within the inching spool, any movement of plunger 128 results in an equal movement of plunger 122. Movement of plunger 122 to the right extends, and therefore relaxes, spring 118 to reduce its effective force acting against the inching spool. Lessening of the effective pressure of spring 118 causes spool 118 to move to the right since right-hand land 114 of the spool is slightly larger in diameter than land 112. Spool 110 continues to move to the right until the differential clutch fluid pressure from passage 64 acting on land 114 balances the effective pressure of spring 118, at which point the spool stops moving.

When spool 110 begins moving to the right, land 112 starts closing passage 60. In its inching position, the spool balances itself against spring 118 before land 112 closes passage 60 completely so that a reduced flow and therefore a reduced pressure is transmitted to passage 64 and the clutch, resulting in a controlled slippage of the selected clutch pack to a degree determined by the applied brake pressure.

By varying the brake line pressure from a lesser amount to a greater amount through manipulation of foot pedal 140, clutch pressure can be varied from a maximum resulting in full clutch engagement through the inching range to a minimum resulting in full clutch disengagement.

d. Neutral

The selected clutch is fully disengaged by applying a brake line pressure just sufficient to partially apply the service brakes. When this occurs, the inching spool does not balance itself against the reduced pressure of spring 118 until land 112 closes clutch passage 60 completely and land 114 moves to the right beyond a bleeding orifice 186 to relieve clutch pressure in passage 64 to disengage the selected clutch pack. When this occurs, plunger 122 is in its extreme right-hand position so that spring 118 has no effective pressure whereby neutralizing spring 152 retains the inching spool in its closed position.

The force of brake pressure regulating spring 148 is selected so that the clutch becomes fully disengaged before the service brakes are fully applied and before brake pressure switch 178 is closed to permit engine starting. This provides a dual safety feature which prevents starting of the engine without both the clutch being disengaged and the wheel brakes being fully applied.

The clutch can also be disengaged in an alternative manner by setting the parking brake to close solenoid valve 42. This closes clutch fluid passage 84, thereby relieving clutch fluid pressure at the right-hand end of the inching cavity. This would cause spring 118 to extend to move plunger 122 to its extreme right-hand position and thereby relieve the inching spool of spring pressure. Thus the inching spool would move to its right and close passage 60 to disengage the clutch. With the parking brake set, contact 168b of the microswitch would be closed, thereby permitting engine restarting.

From the foregoing it will be evident that the transmission can be returned to neutral through the clutch fluid circuit by applying the parking brake or alternatively through the brake fluid circuit by applying the service brakes. With either brake applied, the engine can be restarted, but with neither brake applied, the engine cannot be restarted. The practical effect of the foregoing arrangement is to prevent the starting of the lift truck engine without the operator being in full control of the vehicle. Starting on hills or restarting from a stall is also simplified with this arrangement since the operator need only depress the service brake pedal with one foot and turn the ignition key with one hand to start the engine and thereafter gradually release the brake pedal to start the vehicle moving in either direction as required.

INTEGRATED BLOCK CONSTRUCTION

An important feature of the transmission control described is its integrated block construction. With the exception of the external lines to the accelerator-directional control pedal 82 and master brake cylinder, most fluid flow takes place in the control valve block 26 and in the transmission block through cast or machined passages, as clearly shown in FIG. 4 with respect to the valve block. The inching cavity 62 is a horizontal through opening machined in block 26 with access being possible from either end of the bore through a plug 186 at the clutch fluid end or through cap 188 at the brake fluid end thereof. Similarly, valves 30, 32, 34, 36 and 38 are provided in machined openings in block 26, with the openings being shown vertical in FIG. 4 and being closed at their upper ends by plug caps 192. These various bores intersect the various clutch fluid passages, most of which are cast in place.

The foregoing valve block construction has numerous advantages, among which are economy of manufacture, elimination of exterior piping and resultant leakage problems, and simplicity of assembly with practically no opportunities to assemble the valve block improperly. The block provides for easy maintenance also, because if any valve assembly within the block causes trouble, it can be corrected simply by replacing the troublesome valve with a factory-assembled unit, or alternatively, the entire block can easily be replaced by another factory-assembled unit.

Having illustrated and described a preferred embodiment of the invention, it should be apparent to those skilled in the art that the invention permits of modification in arrangement and detail. I claim as my invention all such modifications as come within the true spirit and scope of the following claims.

I claim:

1. In a lift truck having a driven wheel, hoist means, an engine for supplying power to said wheel and said hoist means, a transmission including fluid-actuated clutch means for alternatively transmitting or interrupting engine power to said wheel and driving said wheel in either a forward or reverse direction, and clutch-operating means, said clutch-operating means comprising:

clutch fluid passage means for directing a pressure fluid from a source of supply to said clutch means, pump means for pumping fluid under pressure through said passage means to said clutch means for engaging the same, and pressure-responsive modulator means operable under a predetermined fluid pressure build-up in said passage means just sufficient to close up said clutch means but insufficient to cause clutch lock-up, to restrict said passage means thereafter and thereby slow the build-up of fluid pressure at said clutch means beyond said predetermined pressure so as to cause a smooth but fast clutch engagement, said pump means being driven by said engine and having an output which varies with the speed of said engine, part of said output being used to operate said hoist means and another part of said output being used to operate said clutch means, and flow control means in conjunction with said pump means establishing a substantially constant flow rate in said passage means throughout the speed range of said engine so that operation of said modulator means to restrict said passage means occurs automatically at substantially the same time relative to clutch lock-up at all engine speeds, whereby clutch engagement is both fast and smooth at both high and low engine speeds.

2. A lift truck according to claim 1 wherein said clutch means includes a forward clutch pack and a reverse clutch pack, a pair of fluid-actuated clutch pistons, one for locking up each of said clutch packs whereby power can be transmitted to said wheels, clutch fluid actuated valve means down-stream toward said clutch means from said modulator means for selectively directing pressure fluid to one or the other of said clutch pistons, said clutch pistons being grounded relative to said drive shaft to eliminate any fluid pressure build-up at said clutch pistons induced by centrifugal force, whereby said clutch engaging is smooth and fast regardless of the speed of rotation of said drive shaft.

3. A lift truck according to claim 1 wherein:
said modulator means provides a modulator cavity,
modulator passage means connecting said clutch passage means and said modulator cavity,
and pressure-responsive means normally permitting the full flow of pressure fluid through said clutch passage means to said clutch means and normally preventing the flow of fluid into said modulator cavity,
said pressure-responsive means being movable under a predetermined pressure in said clutch passage means sufficient to close up said clutch means but insufficient to lock up said clutch means, to restrict said clutch passage means and simultaneously permit the flow of clutch fluid into said modulator cavity to slow the build-up of fluid pressure at said clutch means and thereby effect a smooth lock-up of said clutch means at high engine speeds.

4. In a lift truck having driven wheels, hoist means, an engine supplying power to said wheels and hoist means, a transmission including fluid-actuated forward and reverse clutch means, and fluid-actuated service brake means for braking said wheels, a transmission control system comprising:
engine starter means including an electrical starter circuit,
speed and directional control means for regulating the speed of said engine and for selectively engaging said forward or reverse clutch means,
clutch fluid passage means extending from a source of fluid under pressure to said clutch means,
inching means in said clutch fluid passage means for modulating engagement of said clutch means and thereby controlling the speed of said truck in both directions independently of the speed of said engine,
said brake means including brake fluid passage means containing brake fluid and communicating with said inching means,
manually operable brake-actuating means operable to apply variable pressure to said brake fluid and transmit the same to said inching means,
said inching means being operable under predetermined brake fluid pressure to block said clutch fluid passage and thereby disengage said clutch means,
said inching means being operable under brake fluid pressure less than said predetermined brake fluid pressure to restrict said clutch fluid passage and thereby modulate the engagement of said clutch means to move said truck at a slow speed independent of the speed of said engine,
normally open switch means in said starter circuit,
and switch-actuating means connected to said brake means and operable under brake fluid pressure greater than said predetermined brake pressure necessary to disengage said clutch means for closing said switch means to permit starting said engine,
whereby full application of said brake-actuating means automatically disengages said clutch means and conditions said starter circuit for restarting said engine and whereby partial application of said brake-actuating means enables slow speed motion of said truck at high engine speeds and further whereby release of said brake-actuating means permits full control of the speed of said truck through said control means by varying the speed of said engine.

5. In a lift truck according to claim 4 having pump means driven by said engine and a parking brake means, the transmission control system including:
pilot fluid passage means supplied with clutch-operating fluid by said pump means and connected to said inching means,
said inching means comprising an inching valve assembly balanced between brake fluid pressure in said brake fluid passage means and clutch fluid pressure in said pilot fluid passage means to permit the full flow of clutch fluid through said clutch fluid passage means when both said brake-actuating means and said parking brake means are released and said engine is operating,
said inching valve assembly including means movable upon interruption of clutch fluid pressure in said pilot fluid passage means to close said clutch fluid passage means,
pilot valve means for opening and closing said pilot passage means to the flow of clutch fluid therethrough,
and pilot valve-actuating means operable in response to the application of said parking brake to close said pilot valve means and thereby move said inching valve assembly to a position closing said clutch fluid passage means so as to disengage said clutch means.

6. A transmission control system according to claim 5 wherein:
said pilot valve-actuating means comprises a solenoid means connected in said starter circuit,
said starter circuit including switch means operable through the application of said parking brake means to close said pilot valve and thereby disengage said clutch means and condition said starter circuit for starting said engine,
said switch means being operable through release of said parking brake to open said pilot valve to permit clutch engagement and to open said starter circuit to prevent restarting said engine, whereby said clutch means is disengaged, the wheel brakes are applied and said engine is conditioned for starting by either (1) application of the service brake means or alternatively (2) application of said parking brake means.

7. In a lift truck having driven wheels, hoist means, an engine supplying power to said wheels and hoist means, a transmission including fluid-actuated forward and reverse clutch means, and fluid-actuated service brake means for said wheels, a transmission control system comprising:
clutch fluid passage means extending from a source of clutch fluid under pressure to said clutch means,
inching valve means in said clutch passage means for regulating the pressure of clutch fluid at said clutch means and thereby modulating engagement of said clutch means for controlling the speed of said truck independently of the speed of said engine,
said brake means including brake fluid passage means containing brake fluid and communicating with one end of said inching valve means,
brake-actuating means operable to control the pressure of said brake fluid,
pilot passage means in communication with said clutch fluid pressure source and with the opposite end of said inching valve means,
said inching valve means being balanced between brake fluid pressure at one end thereof and cluch fluid pressure at said opposite end when said engine is running and said brake is released in a position permitting the unrestricted flow of clutch pressure fluid at full pressure through said clutch passage means to said clutch means for engaging the same,
said inching valve means including means movable to block said clutch passage means and disengage said clutch means in response to an increase in said brake fluid pressure to a predetermined extent or alternatively in response to a decrease in clutch fluid pressure to a predetermined extent at said opposite end thereof,
and means for decreasing clutch fluid pressure at the opposite end of said inching valve means for disengaging said clutch means.

8. A transmission control system according to claim 7 including parking brake means in addition to said brake means,
said means for decreasing clutch fluid pressure at said opposite end including valve means in said pilot passage means,
and valve-operating means operable in response to the application of said parking brake means for closing said valve means and thereby disengaging said clutch means and operable in response to release of said parking brake means to open said valve means to permit engagement of said clutch means,
whereby said clutch means can be disengaged either by applying said service brake means or by applying said parking brake means.

9. A transmission control system according to claim 8 including an electrical starter circuit having an ignition switch,
said valve means in said pilot passage means being electrically operated,
said valve-operating means including a first electrical switch means in said starter circuit operable by application of said parking brake means to condition said starter circuit for starting said engine and to close said valve means to disengage said clutch means,
and a normally open second electrical switch means in said starter circuit operable in response to the application of said service brake means to a predetermined extent sufficient to disengage said clutch means and hold said truck against movement to condition said starter circuit for starting said engine independently of said first switch means.

10. A lift truck having drive wheels, hoist means, an engine for powering said hoist means and said drive wheels, transmission means including fluid forward and reverse clutch means for selectively transmitting power from said engine to said drive wheels, and fluid-actuated brake means for said wheels,
an inching control means for moving said truck at slow speed during high-speed operation of said engine,
said inching control including:
means defining an inching cavity,
first clutch passage means including an inlet port leading into said cavity between the opposite ends thereof from a source of clutch fluid under pressure,
second clutch passage means including an outlet port leading from said cavity between the opposite ends thereof to said clutch means,
brake passage means leading from a source of brake fluid under pressure to one end of said cavity,
third clutch passage means leading from communication with said clutch fluid pressure source to the opposite end of said cavity,
a single inching spool within said cavity,
plunger means extending through said spool and being movable back and forth within said cavity under the influence of brake fluid pressure at said one end and clutch fluid pressure at said opposite end of said cavity,
spring means seated between said spool and an enlargement of said plunger means adjacent said opposite end,
said spring means positioning said spool to straddle said inlet and outlet ports,
said inching spool including a pair of spaced lands of unequal diameter, the larger of said lands being positioned so that clutch fluid acting between said lands exerts a differential pressure balancing said spool against the pressure of said spring means and tending to move said spool in a direction to close said inlet port,
the effective pressure of said spring means being variable to control the positioning of said spool in response to variations in brake fluid pressure and clutch fluid pressure at the opposite ends of said cavity so that a lessening of the effective pressure of said spring means tends to restrict said inlet port and reduce fluid pressure at said outlet port and so that an increase in effective pressure of said spring means tends to open said inlet port and increase fluid pressure at said outlet port.

11. An inching control means according to claim 10 including,
second spring means having a lesser effective force than said first spring means biased against said spool in opposition to said first spring means,
said second spring means maintaining said spool in a position blocking said inlet port after the initial closure of said inlet port through reduction of the effective pressure of said first spring means,
and a bleed orifice means leading from said cavity and communicating with said second passage means upon closure of said inlet port so as to disengage said clutch means.

12. In a lift truck wherein an engine drives the truck and a hoist means on the truck and including a transmission with fluid-actuated forward and reverse clutch means and fluid-actuated service brake means,
a transmission control system comprising:
clutch passage means leading from a source of clutch fluid under pressure to said forward and reverse clutch means, inching valve means including an inching cavity in communication with said clutch passage means for modulating clutch pressure for slow truck movement at high engine speed, brake fluid passage means leading from said service brake means to said inching cavity for enabling operation of said inching valve means through said service brake means, clutch selector valve means in communication with said clutch passage means for selectively directing clutch fluid through said clutch passage means to said forward or reverse clutch means, and clutch pressure modulating valve means including a modulator cavity in communication with said clutch passage means for effecting automatically a gradual clutch pressure build-up from the point of clutch close-up to the point of clutch lock-up and thus a smooth clutch engagement following disengagement by either said selector valve means or said inching valve means, all of said valve means including said valve cavities and the portion of said clutch passage means interconnecting said cavities being integrated within a single one-piece valve block, said valve cavities having openings at an exterior surface of said block for insertion and removal said valve means and plugs for said openings.

13. In a lift truck wherein an engine drives drive wheels and a hoist means on the truck and wherein a transmission having fluid-actuated forward and reverse clutch means transmits power from said engine to said wheels, inching means for moving said truck slowly in either direction at high engine speeds, service brake means for braking said wheels, starter means including an electrical starter circuit having an ignition switch therein for starting said engine, and normally open brake switch means in said starter circuit preventing when open the starting of said engine and closable in response to application of said service brake means to an extent sufficient to stop movement of said truck so as to permit starting said engine upon closing said ignition switch.

14. A lift truck according to claim 13 wherein said inching means is operable by said service brake means and includes means operable in response to application of said service brake a predetremined extent less than that necessary to start said engine for disengaging said clutch means, whereby said truck is stopped, said clutch means disengaged and said starter circuit conditioned for starting all upon full application of said service brake means.

15. A lift truck according to claim 13 including parking brake means, and additional switch means in said starter circuit closable upon application of said parking brake means to permit starting said engine upon closing said ignition switch even though said brake switch means may be open.

16. A lift truck according to claim 15 including, first clutch-disengaging means operable in response to application of said service brake means to an extent less than that necessary to start said engine for disengaging said clutch means, and second clutch-disengaging means operable in response to the application of said parking brake for disengaging said clutch means, whereby said truck can be stopped, said clutch means disengaged, and said starter circuit conditioned for starting said engine alternatively by applying said service brake means or by applying said parking brake means.

17. A lift truck according to claim 16 wherein said first and second clutch-disengaging means both operate said inching means to disengage said clutch means, said inching means being operable by said service brake means to inch said truck slowly at high engine speeds, directional control means operable independently of said inching means to disengage an engaged one of said forward and reverse clutch means and engage the other of said forward and reverse clutch means, and clutch modulator means including flow regulator means operable automatically upon actuation of said directional control means to slow the build-up of clutch fluid pressure after the closing of the selected one of said clutch means but before the lock-up thereof to cause a smooth but fast clutch engagement at all engine speeds.

18. A transmission control system according to claim 7 wherein said inching valve means includes, means defining an inching cavity, a clutch fluid portion of said cavity separated from said one end in communication with said brake fluid passage means, defining part of said clutch fluid passage means, an inching spool within said portion for controlling the flow of clutch fluid therethrough, inching spool actuating means extending between said one end and said clutch fluid portion including a piston means in contact with brake fluid at said one end, and means between said one end and said clutch fluid portion for preventing the cross flow of brake fluid and clutch fluid including first and second sealing means carried by said actuating means and spaced from one another, a recessed surface portion of said cavity positioned between said first and second sealing means, and a drain port means leading from said recessed surface portion to a leakage fluid receiving means outside said cavity.

19. In a lift truck having a driven wheel, hoist means, an engine for supplying power to said wheel and said hoist means, a transmission including fluid-actuated clutch means for alternatively transmitting or interrupting engine power to said wheel and driving said wheel in either a forward or reverse direction, and clutch-operating means, said clutch-operating means comprising:

clutch fluid passage means for directing a pressure fluid from a source of supply to said clutch means, pump means for pumping fluid under pressure through said passage means to said clutch means for engaging the same, and pressure-responsive modulator means operable under a predetermined fluid pressure build-up in said passage means just sufficient to close up said clutch means but insufficient to cause clutch lock-up, to restrict said passage means thereafter and thereby slow the build-up of fluid pressure at said clutch means beyond said predetermined pressure so as to cause a smooth but fast clutch engagement, said modulator means including restricting means movable into said passage means to block the same in response to a predetermined fluid pressure in said passage means sufficient to close said clutch means, but just less than required for clutch lock-up, and orifice means operable upon blockading movement of said restricting means into said passage means to permit thereafter continued build-up of fluid pressure at said clutch means, beyond said predetermined pressure, but at a sufficiently reduced rate so as to result in a smooth lock-up of said clutch means, said orifice means extending through said restricting means so as to be intruded into said passage means upon blockading movement of said restricting means into said passage means.

References Cited

UNITED STATES PATENTS

| | | | |
|---|---|---|---|
| 2,472,694 | 6/1949 | Chouings | 192—109 |
| 2,950,734 | 8/1960 | Hasbany | 137—495 |
| 2,977,979 | 4/1961 | Hasbany | 137—495 |
| 3,099,166 | 7/1963 | Schou | 192—87 |
| 3,240,371 | 3/1966 | Conrad | 214—140 |

EVON C. BLUNK, *Primary Examiner.*

HUGO O. SCHULZ, H. C. HORNSBY,

*Assistant Examiners.*